UNITED STATES PATENT OFFICE.

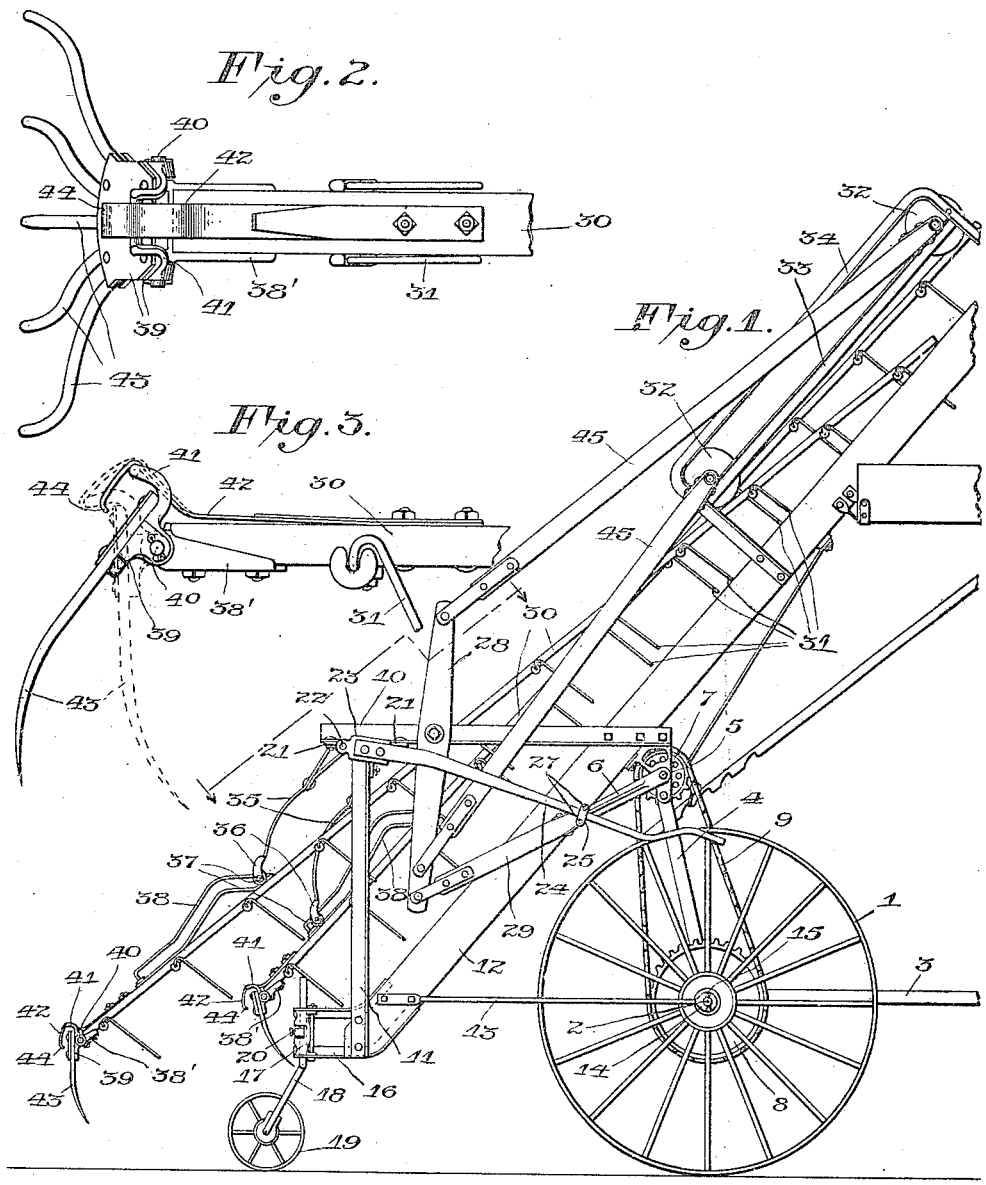

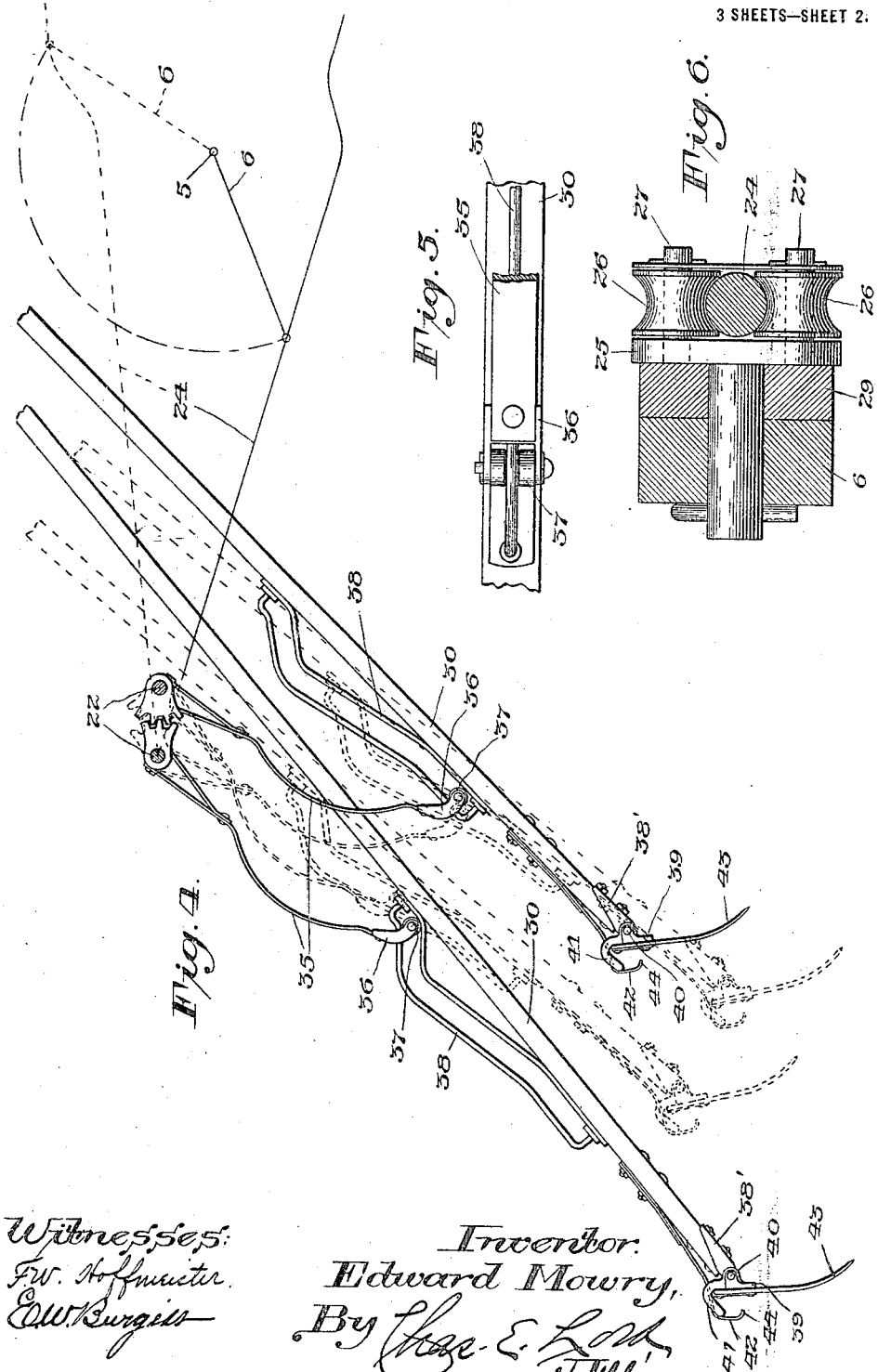

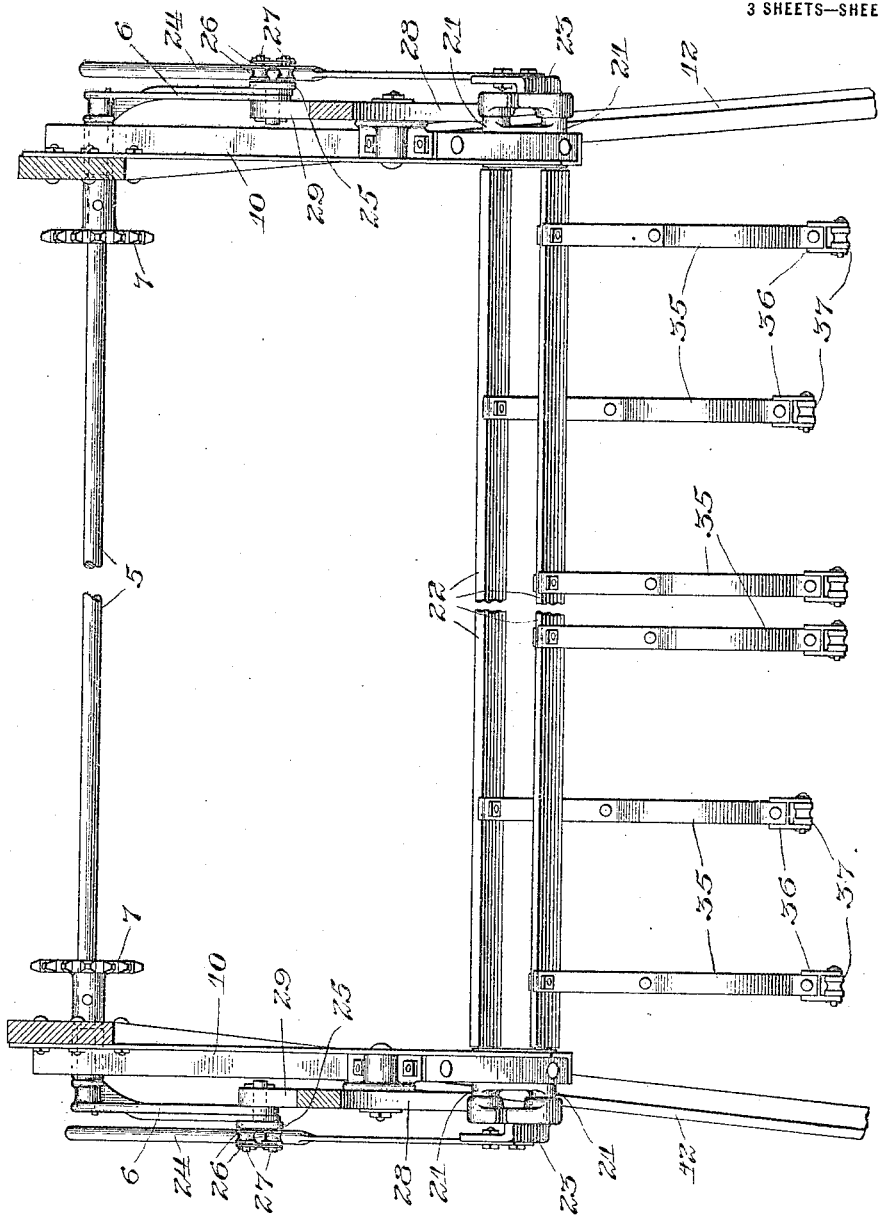

EDWARD MOWRY, OF STERLING, ILLINOIS, ASSIGNOR TO INTERNATIONAL HARVESTER COMPANY OF NEW JERSEY, A CORPORATION OF NEW JERSEY.

HAY-LOADER.

1,229,640. Specification of Letters Patent. Patented June 12, 1917.

Application filed August 23, 1913. Serial No. 786,340.

*To all whom it may concern:*

Be it known that I, EDWARD MOWRY, a citizen of the United States, residing at Sterling, in the county of Whiteside and State of Illinois, have invented certain new and useful Improvements in Hay - Loaders, of which the following is a full, clear, and exact specification.

My invention relates to hay loaders of the walking rake type, and comprises improved power transmission mechanism operative between the traction wheels and the rakes, and improved means for controlling the path of movement of the rakes. The object of my invention is to provide a construction that is both strong and durable and efficient in operation, and it is particularly designed as an improvement on the structure shown in Patent No. 926,177, dated June 29, 1909, S. K. Dennis. These objects are attained by means of mechanism, one embodiment of which is illustrated in the accompanying drawings, in which—

Figure 1 is a side elevation of part of a hay loader having my invention embodied in its construction;

Fig. 2 is a top plan view of part of one of the walking rakes;

Fig. 3 is a side elevation of Fig. 2;

Fig. 4 is a side elevation of part of the walking rake mechanism and designed to illustrate the operation of the mechanism for controlling the path of the walking members relative to the ground;

Fig. 5 is a top plan view of part of one of the rake guiding members;

Fig. 6 is a sectional elevation of a detail part of the rake controlling mechanism; and Fig. 7 is a fragmentary view as seen when looking in the direction of the arrows in Fig. 1.

The same reference characters designate like parts throughout the several views.

The loader is mounted upon carrying and traction wheels 1 that are mounted upon opposite ends of an axle 2. 3 represents draft frame members upon opposite sides of the machine that converge forwardly in a common way, forming means for attaching the loader to a wagon. 4 represents one of a pair of vertically arranged frame members at opposite sides of the machine; 5 represents a transversely disposed shaft journaled in bearings carried by the frame and having secured thereto, at opposite ends, crank arms 6, and adjacent the crank arms sprocket wheels 7 are secured to said shaft. Sprocket wheels 8 are operatively connected with the axle and connected with the sprocket wheel 7 by means of sprocket chains 9. 10 represents one of a pair of longitudinally arranged frame members upon opposite sides of the machine, having their front ends secured to the vertical frame members 4 and their rear ends to vertical frame members 11. 12 represents side frame members of the elevator frame, having their middle portions secured to the forward ends of the frame members 10, the side members being inclined upward from rear to front of the machine and having their lower ends secured to the lower ends of the vertical frame members 11, and 13 represents brace members having their rear ends secured to the side frame members 12 and their front ends provided with eye portions 14 that receive the outer ends of the axle, and 15 represents cotter keys that retain them in place thereon. 16 represents rearwardly extending bracket members secured to the lower end of the elevator frame and provided with vertically arranged bearing members 17 in which are journaled caster arms 18, having caster wheels 19 journaled upon their lower ends, the arms being adjustable vertically and secured in position by means of set screws 20. The lower end of the elevator may be adjusted toward or from the ground by means of the caster wheel mechanism.

Secured to the rear ends of the frame members 10 are bearing boxes 21 in which are journaled a pair of parallel rock shafts 22, having secured to opposite ends thereof intermeshing gear segments, one of said segments at opposite sides of the machine being provided with a crank arm 23 to which is secured the rear ends of one of a pair of levers 24, the front of the levers being curved upward and forward, forming a reversed curved portion. 25 represents a bearing member pivotally mounted upon the end of crank arm 6 and comprising grooved rollers 26 journaled upon bearing pins 27 disposed upon opposite sides of the levers 24 in a manner to permit a free rolling movement of the rollers upon the levers when the shaft 5 is rotated. 28 represents vertically disposed levers that are pivotally mounted intermediate their ends upon the frame members 10, upon opposite sides of the machine, the lower end of each of said levers being connected with the bearing members 25 by means of short pitmen 29.

30 represents the rake bars that are arranged in two separate gangs above the elevator deck and provided with depending teeth 31, spaced apart and operative to move the material up the elevator when the rake bars are moved longitudinally relative thereto. The upper ends of each gang of rake bars are connected by means of transverse bars, and flanged wheels 32 are journaled upon opposite ends of the bars and roll upon tracks 33. 34 represents guard rails that limit the upward movement of the gangs. The lower ends of the rake bars in each gang are independently connected with the rock shafts 22, one of the gangs being connected with one shaft and the other gang with the other shaft, the connecting means being a series of resilient bars 35, having their upper ends secured to one of the rock shafts and their lower ends to forked members 36, in which are journaled rollers 37 that engage with bracket members 38 secured to the rake bars, the bracket members comprising a lower flat member and an upper round member or peaked portion, the rollers 37 having a centrally disposed groove that receives the round member in a manner to prevent a lateral swing of the rake bars. The lower ends of the bracket members are disposed parallel with the bars, their body portions are inclined upward and forward, and their front portions are inclined downward toward the rake bars, forming cam-shaped brackets; the function of the cam-shaped brackets being to control the path of movement of the lower ends of the bars. $38^1$ represents bracket members secured to the lower ends of the rake bars and provided with transversely arranged bearing portions. 39 represents a rake tooth carrying member having forwardly extending ear members by means of which it is pivotally connected with bracket member $38^1$ by means of a pin 40; an upwardly and rearwardly curved nose portion 41, that engages with a plate spring 42, that is secured to the rake bar, the spring being operative to yieldingly retain the teeth 43 and tooth carrying member 39, to which they are attached, in operative position, the spring having a curved portion terminating in a hook 44 at its rear end that limits a swinging movement of the teeth in one direction. The bars that connect the upper ends of each gang of rakes are connected with the vertical bars 28, upon opposite sides of the axis thereof, by means of pitmen 45 that are connected with the journals upon which the wheels 32 are mounted.

In operation motion is transmitted from the traction wheels to the crank shaft 5, which actuates the levers 24 that rock the shafts 22 and thereby transmits a rising and falling movement to the lower ends of the rake gangs and through the pitmen 29, a vibrating movement to the lever 28, and, through the pitmen 45, a longitudinal movement to the rake gangs. It is desirable in this class of machines that the orbital path of the lower ends of the rake bars be such as to retain the rakes in contact with the ground as long as possible, and the operation of the curved portion of the levers 24, combined with that of the angular rake guiding cams 38, produces that result in a very satisfactory manner.

While I have in this application specifically described one embodiment which my invention may assume in practice, it is, of course, to be understood that the form shown is used for purposes of illustration and may be modified without departing from its spirit.

What I claim as my invention, and desire to secure by Letters Patent, is:

1. In a hay loader, a frame, a plurality of longitudinally movable rising and falling rake gangs carried thereon, operating means for imparting a raking and upward and downward movement to said gangs, and curved cam means on the gangs coöperating with said operating means for maintaining their rakes substantially parallel to the ground during their raking movement.

2. In a hay loader, a frame, a plurality of longitudinally movable rising and falling rake gangs carried thereon, operating means for imparting a raking and upward and downward movement to said gangs, and means including upwardly extending curved cam members carried on said rake members and coöperating with said operating means for maintaining said rakes in parallel relation to the ground during their raking movement.

3. In a hay loader, a frame, a plurality of longitudinally movable rising and falling rake gangs carried thereon, operating means for imparting a raking and upward and downward movement to said gangs including a reversely curved lever, and operative connections between said operating means and said rake gangs coöperating therewith in maintaining said gangs substantially parallel to the ground during their raking movement.

4. In a hay loader, a frame, a plurality of longitudinally movable rising and falling rake gangs carried thereon, operating mechanism therefor including meshing segments, a cam track carried on each of said rakes having a peaked portion at its upper end, and connecting members movable with said segments and engaging said cam tracks to maintain said gangs substantially parallel to the ground during their raking movement.

5. A hay loader including, in combination, an elevator frame, separate gangs of longitudinally movable rising and falling rakes, a transverse shaft journaled upon said frame and provided with cranks at opposite ends thereof, vertically arranged levers pivotally connected with said frame at opposite sides thereof, pitmen connecting one end of said levers with said cranks and opposite ends thereof with the separate gangs of rakes, transverse rock shafts mounted upon said frame and connected with said rakes, and means for rocking said shafts in opposite directions, said means including intermeshing gear segments secured to opposite ends of said shafts and levers connected with said cranks, said levers having reversed curved portions at their front ends that coöperate with the associated parts of the mechanism in controlling the path of movement of the rakes.

6. A hay rake including, in combination, an elevator frame, separate gangs of longitudinally movable rising and falling rakes, a transverse shaft journaled upon said frame and provided with cranks at opposite ends thereof, vertically arranged levers pivotally connected with said frame at opposite sides thereof, pitmen connecting one end of said levers with said cranks and opposite ends thereof with the separate gangs of rakes, transverse rock shafts mounted upon said frame, spring bars connecting the individual rake bars of one gang to one of said shafts and like connections between the other shafts and the other gangs, and means for rocking said shafts in opposite directions, said means including intermeshing gear segments secured to opposite ends of said shafts and levers connecting said segments with said cranks, said levers having reversed curved portions at their front ends that coöperate with the associated parts of the mechanism in controlling the path of movement of the rakes.

7. A hay loader including, in combination, an elevator frame, separate gangs of longitudinally movable rising and falling rakes, a transverse shaft journaled upon said frame and provided with cranks at opposite ends thereof, vertically arranged levers pivotally connected with said frame at opposite sides thereof, pitmen connecting one end of said levers with said cranks and opposite ends thereof with the separate gangs of rakes, transverse rock shafts mounted upon said frame and connected with said rakes, means for rocking said shafts in opposite directions, said means including intermeshing gear segments secured to opposite ends of said shafts, and levers having their opposite ends secured to segments at opposite sides of the machine and their forward ends provided with reversed curved portions having rolling contact with said cranks.

8. A hay loader including, in combination, an elevator frame, separate gangs of longitudinally movable rising and falling rakes, and means for transmitting a longitudinal rising and falling movement to said rakes, said means including a transverse shaft journaled upon said frame and having cranks secured to opposite ends thereof, lever mechanism connecting said rake gangs with said cranks in a manner to transmit longitudinal movement to said gangs, transverse rock shafts mounted upon said frame and connected with said rakes, intermeshing gear segments connected with said rock shafts, and lever connections between said segments and said cranks, said levers being provided with reversed curved portions at their front ends having rolling contact with said cranks.

9. A hay loader including, in combination, an elevator frame, separate gangs of longitudinally movable rising and falling rakes, means for transmitting a longitudinal rising and falling movement to said rakes, said means including a transverse shaft journaled upon said frame and having cranks secured to opposite ends thereof, lever mechanism connecting said rake gangs with said cranks in a manner to transmit longitudinal movement to said gangs, transverse rock shafts mounted upon said frame, curved cam shaped tracks carried on said rake gangs, and arms having their lower ends slidably connected with the rakes in one gang by means of said cam-shaped tracks and their opposite ends secured to one side of said rock shaft.

10. A hay loader including, in combination, an elevator frame, separate gangs of longitudinally movable rising and falling rakes, a transverse shaft journaled in said frame and provided with cranks at opposite ends thereof, vertically arranged levers pivotally connected with said frame at opposite sides thereof, one end of said levers being connected with said cranks by means of pitmen and opposite ends thereof with separate gangs of rakes, transverse rock shafts mounted upon said frame, arms having one end connected with said rock shafts and their opposite ends slidably connected with the individual rakes, means for rocking said shafts, said means including intermeshing gear segments secured to opposite ends of said shafts, levers having their rear ends connected with said segments and reversely curved forward ends slidably connected with said cranks, bearing blocks pivotally mounted upon said cranks coaxially with the pitmen connected thereto and provided with grooved rollers that engage with opposite sides of said levers.

11. A hay loader including, in combination, an elevator including a longitudinally arranged deck, a series of rakes adapted to rake the hay from the ground and conduct it along said deck, said rakes including longitudinally arranged bars, brackets secured to the lower ends of said bars, rake tooth carrying members pivotally connected with said brackets and provided with rearwardly extending nose portions, and plate springs carried by said bars and engaging with said nose portions.

12. A hay loader including, in combination, an elevator including a longitudinally arranged deck, a series of rakes adapted to rake the hay from the ground and conduct it along said deck, said rakes including longitudinally arranged bars, brackets secured to the lower ends of said bars, rake tooth carrying members pivotally connected with said brackets and provided with rearwardly extending curved nose portions, and plate springs secured to said bars and provided with curved rear ends having sliding contact with said nose portions.

13. A hay rake including, in combination, an elevator including a longitudinally arranged deck, a series of rakes adapted to rake the hay from the ground and conduct it along said deck, said rakes including longitudinally arranged bars, brackets secured to the lower ends of said bars, rake tooth carrying members pivotally connected with said brackets and provided with rearwardly extending nose portions, plate springs secured to said bars and provided with curved rear ends having sliding contact with said nose portions, said springs terminating in hook portions that are operative to limit a swinging movement of said tooth carrying members in one direction.

In testimony whereof I affix my signature, in the presence of two witnesses.

EDWARD MOWRY.

Witnesses:
S. M. MINGLE,
W. H. BARNUM.

Copies of this patent may be obtained for five cents each, by addressing the "Commissioner of Patents, Washington, D. C."